UNITED STATES PATENT OFFICE.

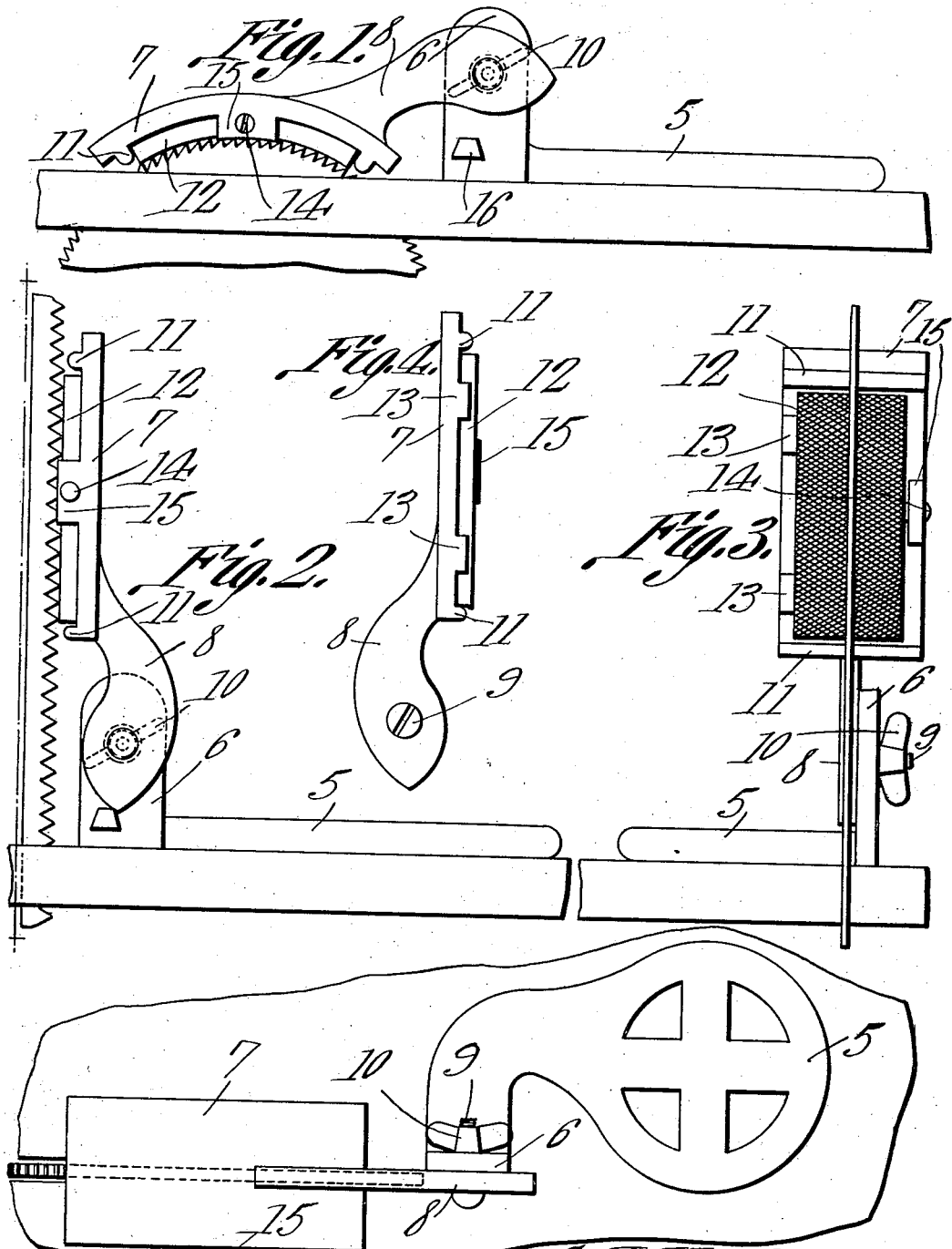

GEORGE J. KARLE, OF BUFFALO, NEW YORK.

SAW-JOINTER.

1,024,007.      Specification of Letters Patent.      Patented Apr. 23, 1912.

Application filed April 10, 1911. Serial No. 620,048.

*To all whom it may concern:*

Be it known that I, GEORGE J. KARLE, a citizen of the United States, residing at Buffalo, in the county of Erie and State of New York, have invented a new and useful Saw-Jointer, of which the following is a specification.

It is the object of the present invention to provide an improved jointer for circular and band saws adapted to be placed and held upon the table of the saw by the operator, and adjustable for use in connection with a saw of either of the two types mentioned.

One aim of the present invention is to provide for proper and advantageous adjustment of the member which carries the abrading element relatively to its supporting member, which is yieldingly held for saw action by the hand of the operator.

Another feature of the invention resides in the provision of means for limiting the adjustment of said holder for the abrading element, to upright position in which position it is adapted for use in jointing a band saw.

In the accompanying drawing—Figure 1 is a view in side elevation of the jointer embodying the present invention, the same being shown as arranged for use in jointing a circular saw. Fig. 2 is a similar view illustrating the jointer arranged for use in jointing a band saw. Fig. 3 is a front elevation of the jointer. Fig. 4 is a side elevation of the holder for the abrading element of the jointer, detached. Fig. 5 is a plan view of the jointer.

In the drawing the supporting and attaching base of the device is indicated by the numeral 5 and includes a short flat sided standard 6. This base 5 is designed to be held yieldingly and slidably upon the table of a rotary or band saw by the party using the jointer and pivoted to its standard 6 is the shank 8 of a holder for an abrading element such as a file or a block of emery.

The holder for the abrading element, above mentioned, consists of an arched or a flat body 7 formed with an integral shank 8 which has a threaded stud 9 integral therewith and fitted pivotally through an opening in the standard 6, there being a wing nut 10 threaded upon the said stud for the purpose of clamping the shank of the said holder to the standard, at various angular adjustments.

The body 7 of the holder above referred to is formed at its end, upon one face, with flanges 11 between which the abrading element, here shown as a file 12, is disposed, one side of the file resting flat against the said face of the body 7. One lateral edge of the file 12 rests against lugs 13 formed upon the said face of the body of the holder at one side thereof, and a set screw 14 is threaded through an ear 15 at the other side of the said face of the holder body and bears against the other lateral edge of the file 12 whereby to clamp the file in place.

From the foregoing it will be readily understood that when the device embodying the present invention is to be used in jointing a rotary saw which is positioned about as shown in Fig. 1 of the drawing, the thumb nut 10 is to be loosened and the holder for the abrading file 12 is to be adjusted to bring the file in contact with the periphery of the saw. The thumb nut is then tightened and the saw is rotated to bring its teeth across the face of the file.

In using the device to joint a band saw, the holder for the abrading file is adjusted to about the position shown in Fig. 2 of the drawing. The holder is limited in its adjustment to this latter position by reason of the engagement of the extremity of the shank 8 of the holder 7 with an abutment lug 16 formed upon the standard 6. The base 5 is now slid upon the saw table gradually until the abrading element slightly contacts the moving saw teeth, the longest teeth being jointed first while the jointer is yieldingly held and gradually moved into closer engagement with the saw teeth. By this means no harsh action is imparted to the saw or the jointer, and as the saw action is such as to normally slide the jointer away from the teeth, should the operator release or ease his grip upon the base 5, there is less danger of accident or injury to the operator, saw and jointer.

What is claimed is:

The herein described saw jointer, having a base plate provided with an enlarged overbalancing portion and a reduced portion terminating with a standard projecting upwardly and at right angles therefrom, an abrading element carrying member having an integral shank off set from its back at one end thereof, said shank terminating in a pointed end, a screw pivotally connecting the shank to the standard, a wing nut disposed to coact with the screw to lock the shank and standard in adjusted position, and a lug formed integral with the standard in the path of to engage the pointed end of the shank to limit the elevation of the abrading element carrying member.

In testimony that I claim the foregoing as my own, I have hereto affixed my signature in the presence of two witnesses.

GEORGE J. KARLE.

Witnesses:
JOHN G. CLOAK,
GEORGE E. KOCH.

Copies of this patent may be obtained for five cents each, by addressing the "Commissioner of Patents, Washington, D. C."